United States Patent [19]

Neumeyer

[11] 4,338,853
[45] Jul. 13, 1982

[54] MEANS TO MINIMIZE THE BACKLASH OF MESHING GEARS

[75] Inventor: Martin J. Neumeyer, Utica, Mich.

[73] Assignee: The United States of America as represented by the Secretary of the Army, Washington, D.C.

[21] Appl. No.: 88,433

[22] Filed: Oct. 26, 1979

[51] Int. Cl.³ .............................................. F41F 21/02
[52] U.S. Cl. .................................... 89/41 R; 74/384; 74/409; 74/526
[58] Field of Search .................. 89/41 R, 41 M, 41 H; 74/409, 384, 526

[56] References Cited

U.S. PATENT DOCUMENTS

| | | | |
|---|---|---|---|
| 2,542,217 | 2/1951 | Stacey et al. | 89/41 M |
| 3,995,509 | 12/1976 | Backus et al. | 89/41 R |
| 4,047,447 | 9/1977 | Culver et al. | 74/409 |
| 4,117,809 | 10/1978 | Kittler | 74/526 |

OTHER PUBLICATIONS

Fredrick T. Gutmann, "18 Ways to Control Backlash in Gearing", Product Engineering, Oct. 26, 1959, pp. 71–72.

*Primary Examiner*—Stephen C. Bentley
*Attorney, Agent, or Firm*—Peter A. Taucher; John E. Becker; Nathan Edelberg

[57] ABSTRACT

A precision power gear train assembly particularly adaptable for use with vehicles having a 360° rotatable turret mounted thereon. The assembly embodies novel spring and stop means to minimize backlash and to limit gear tooth disengagement of the enmeshed output pinion and ring gears of such an assembly. More specifically a pinion-ring gear assembly mounts a gear box to oscillate about an axis parallel to the pinion axis of rotation such that the tooth pressure between pinion and ring gear biases the teeth apart, increasing backlash. A preloaded spring biases the gear teeth into tight mesh to eliminate backlash until the tooth pressure force exceeds a predetermined maximum. Thereafter, further increases in the tooth pressure force separates the teeth by compression of the spring beyond its preloaded compression. A stop limits tooth separation.

6 Claims, 4 Drawing Figures

MEANS TO MINIMIZE THE BACKLASH OF MESHING GEARS

GOVERNMENT INTEREST

The invention described herein may be manufactured, used, and licensed by or for the Government for governmental purposes without payment to me of any royalty thereon.

BACKGROUND AND SUMMARY OF PRIOR ART

Prior art devices designed to cope with backlash approach the problem by means of springs disposed to put a torsional bias on a gear. Such devices are unsatisfactory in that they are too expensive, unreliable from the accuracy point of view, and too expensive to maintain. Fire control systems require a high degree of accuracy in order to come at all close to a first-round hit capability, because the accuracy of enemy fire and the speed and fluidity of movement in modern war are such that one chance at the target may be all the gunner will get.

SUMMARY OF THE INVENTION

The invention mounts a drive motor on a support for drive of an output pinion, the support pivoting about an axis which enables backlash to vary from zero to a maximum which is substantially less than total separation of the meshing gears. Spring pressure biases the output pinion into maximum engagement with its compatible meshing gear, toward zero backlash mesh, and prevents backlash until the tooth pressure load attains a predetermined maximum. Tooth pressure loads greater than said maximum push the teeth toward disengagement against the spring bias, and a positive stop is engaged by the pivoting support before total separation of the teeth of the meshing gears takes place. So that the tooth pressure load which biases the gear teeth apart may be independent of the direction of turret rotation, the line connecting the axes of rotation of the drive pinion and its meshing ring gear is perpendicular to the line connecting the support pivot axis with the pinion axis of rotation.

It is accordingly an object of the invention to provide a backlash eliminator which provides precise control of turret position during target tracking with zero backlash in the gears of the turret drive, but which permits very rapid slewing of the turret for initial target pick-up while limiting gear tooth separation to something less than total disengagement.

IN THE DRAWINGS

FIG. 4 is a side elevation view of a combat vehicle of the type for which the invention disclosed and claimed herein was developed.

DETAILED DESCRIPTION OF STRUCTURE

Figure 1:
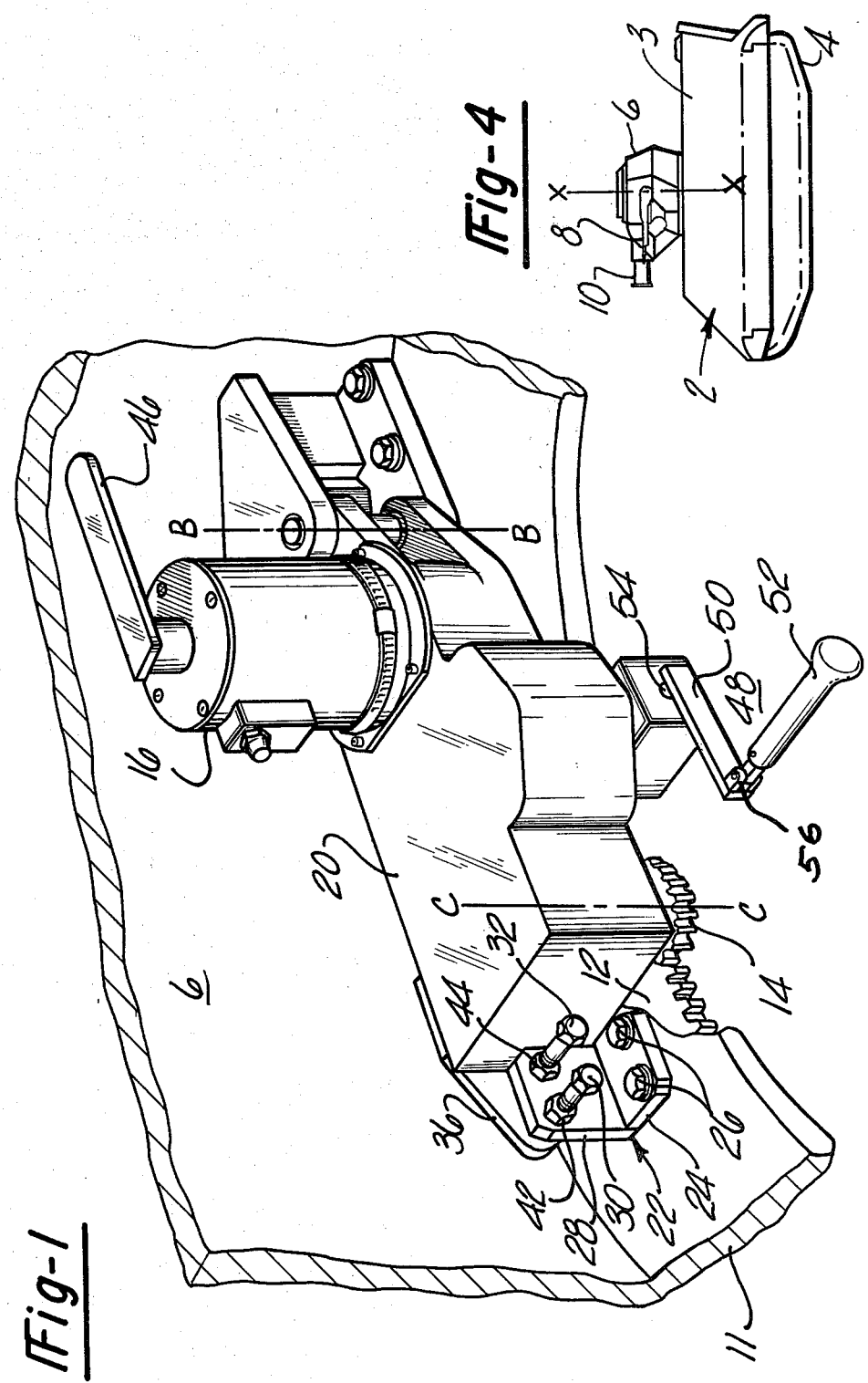
FIG. 1 is a perspective view of a turret drive embodying the invention.

The turret drive disclosed and claimed herein was invented and developed for a combat vehicle adapted to launch missiles from a turret having 360° traverse such as described in copending application Ser. No. 189,980 filed Oct. 20, 1980. For precise fire control, the turret drive should be as free as possible from backlash. It will be understood by those skilled in the art that a precision drive like that disclosed and claimed in this application can be used in many other applications requiring a zero backlash gear train.

In this application, I disclose (FIG. 4) a combat vehicle 2 which is conventionally exoskeletal, having a body hull 3 or armor plate which forms the basic relatively stationary supporting structure of the vehicle, propelled by a track 4 upon which a turret 6 is mounted to rotate about a given body axis X—X. The turret carries one or more weapons, such as those shown at 8 and 10. Turret 6 is mounted for 360° traverse about said body axis X, FIG. 3, and X—X, FIG. 4. A base plate 11 is in the form of an annulus, is an integral part of the turret, and as such rotates with the turret relative to the relatively stationary body hull.

Secured to the hull below base plate 11 is a ring gear 12, here shown fragmentarily in FIG. 1; the ring gear appears more fully in FIG. 3 of the above-identified (Ser. No. 189,980) copending patent application. An output gear in the form of a drive pinion 14 meshes with ring gear 12 and is connected to be driven by a motor 16. As the referenced copending application indicates, a preferred mode of the invention has been constructed in which motor 16 is an electric motor.

As indicated above the output gear of the power train is pinion 14, and the gear it "drives" is ring gear 12 which in conventional terms is the compatible gear of the power user. These conventional terms, output gear and compatible gear of a power user, are the terminology used in the claims. From one conventional point of view, pinion 14, the output gear, is seen as "driving" ring gear 12, the compatible gear.

Motor 16 is connected to drive the output gear, pinion 14, through conventional power train means for transmitting torque shown schematically at 18 in the referenced application and here shown without details as housed in a gear box 20. Thus motor 16 drives pinion 14 through a conventional power train. However, because the vehicle hull, and thus the ring gear 12 attached thereto, are relatively stationary in comparison to the turret rotatably mounted thereon, the net effect of the drive force applied at the output pinion gear 14 is to drive the turret 6 within its aforesaid 360° traverse path about axis X—X.

Figure 2:
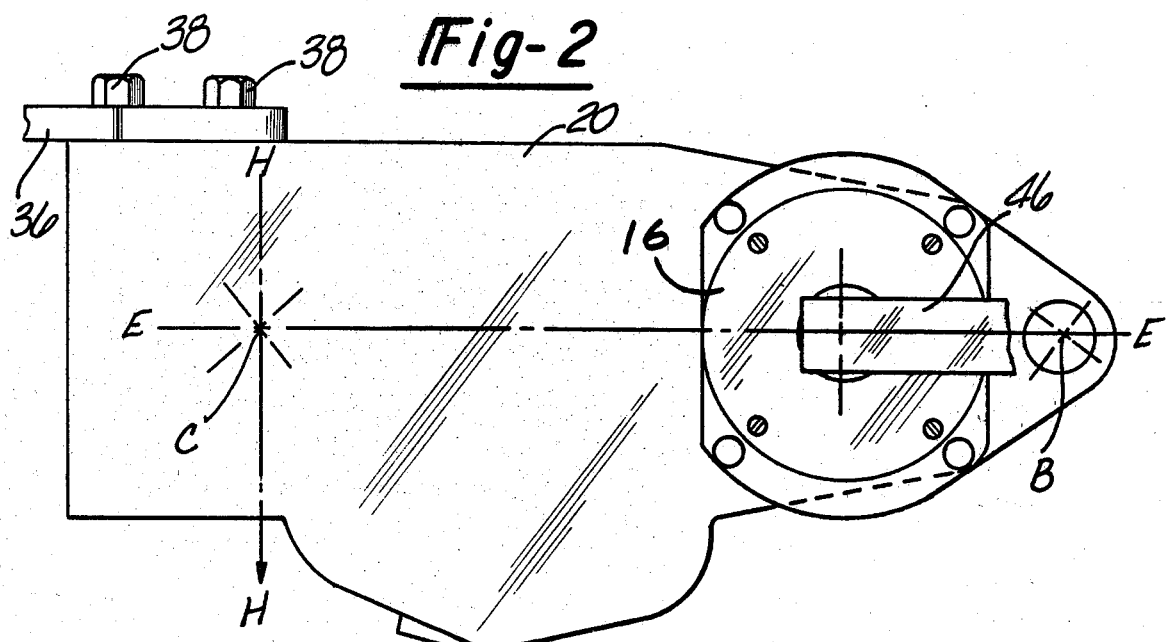
FIG. 2 is a top plan view of a portion of the structure shown in FIG. 1, illustrating the preferred relationship of a feature which makes the gear disengaging force independent of the direction of rotation of the turret.

For the purpose of describing this invention, gear box 20 (the "housing"), will be referred to as a power train support to indicate that it is the structural supporting base for the power train assembly. That power train support is mounted on base plate 11 for oscillation about an axis B—B as seen in FIG. 1 and as shown at B in FIG. 2. The axis of rotation of pinion gear 14 is shown at C—C in FIG. 1 and at C in each of FIGS. 2 and 3. Axes B—B and C—C are conventionally parallel to the turret axis, X in FIG. 3, which, also conventionally, passes through the center of ring gear 12.

It will be understood by those skilled in the art that the point of tooth contact, as seen in a plane perpendicular to axis C—C, between gears 12 and 14 will be at the point of tangency of the pitch circles of both gears and that the point of tooth contact is also the pressure point at which one gear drives the other. As gear designers know, that pressure point lies in a plane tangent to both tooth surfaces. Conventionally, that tangent plane makes an angle with the tangent to the pitch circle which is 14½° or 20°—the two most common angles. Consequently, the force concentrated at that pressure point has a radial component which has a tendency to push the gears out of mesh.

It is desirable that the disengaging force, which tends to unmesh the gears, be independent of the direction of turret rotation. Attention is therefore now invited to the line of centers E—E, FIGS. 2 and 3, connecting axes B—B and C—C; and likewise to the line of centers H—H, also FIGS. 2 and 3, connecting axes C—C and X. So that the tooth disengaging force may be independent of the direction of turret rotation, the referenced two lines of centers should intersect at right angles, at the point C shown in each of FIGS. 2 and 3.

Figure 3:
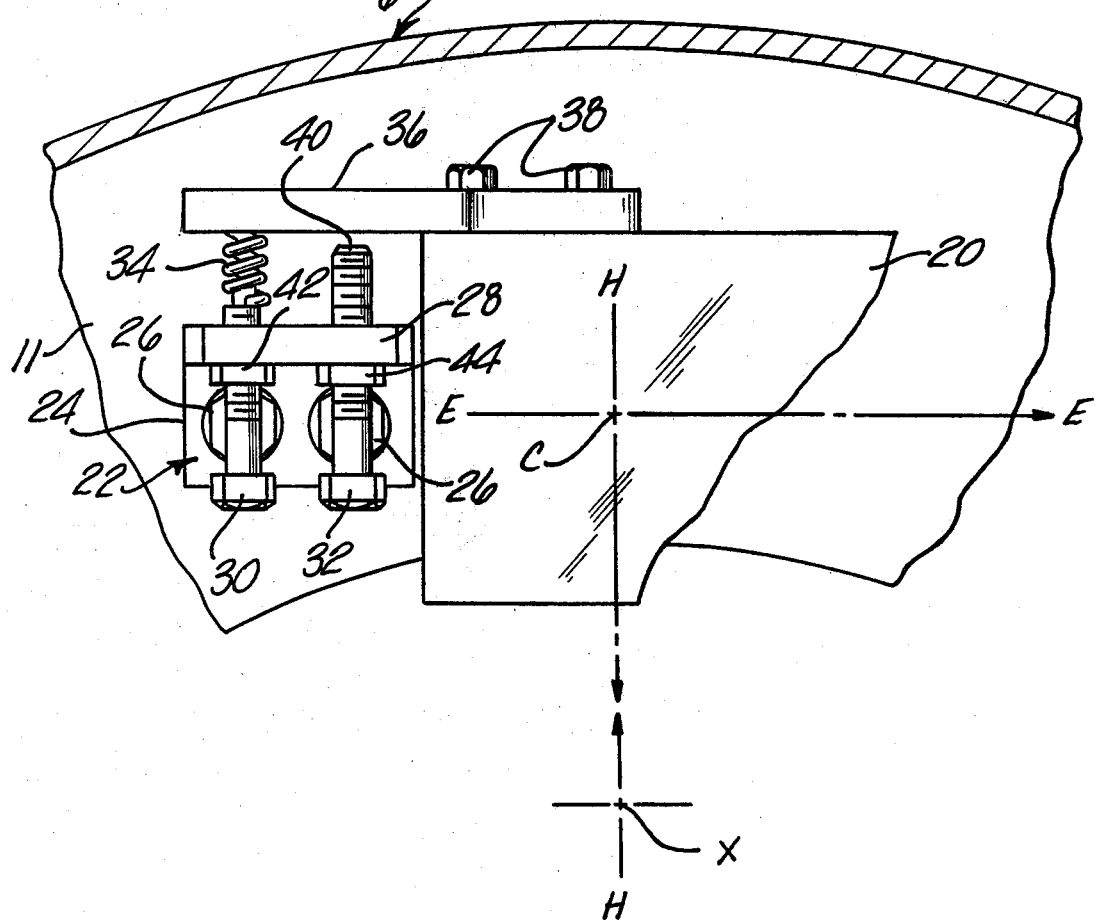
FIG. 3 is a top plan view of that portion of the structure which biases the gears into mesh and limits the extent of gear disengagement.

Referring now particularly to FIG. 3, I show resilient means for biasing the two gears 12 and 14 toward a tighter tooth engagement, and thus toward minimization and preferably complete elimination of backlash. Toward that end, power train support 20 is biased clockwise as seen in FIG. 3 to force pinion 14 into more firm engagement with its compatible ring gear 12. A fixed bracket 22 has a horizontal member 24 which is affixed to base plate 11 by means of threaded fasteners 26. Bracket 22 also has an upright member 28 which has threaded engagement with threaded rod or screw members 30 and 32. One end of threaded member 30 has secured to it a spring 34 adapted to engage a swinging bracket 36 which is fastened to the power train base or support 20 by other threaded members 38.

The gear tooth contact pressure biases gears 12 and 14 apart which tends to oscillate power train support or base 20 counterclockwise about axis B—B. If that pressure is great enough, it can if not restrained, force the two gears out of mesh. To prevent total disengagement of the teeth, I have provided aforesaid threaded rod member 32 which serves, at its end 40, as a stop to limit separation of the gear teeth to a distance which is safely less than enough to disengage the gears. Jam nuts 42 and 44 on threaded members 30 and 32, respectively, are adapted to engage upright member 28 to lock their threaded members against accidental turning.

It is noted that zero backlash is in this application not a constant requirement. When moving into combat, the gunner is scanning the field for a target; eventually he finds a target and may need to quickly operate the fire control means, i.e., he may need to slew the turret quickly to bring the target into the field of view of the tracking scope. At the time of slewing the turret, zero backlash is of no use and may even be a handicap. Threaded member 30 is adjusted to put spring 34 under such a preload that it can be compressed enough to allow sufficient backlash for ready slewing of the turret to rapidly bring the target into the field of view of the sighting device. The close proximity of end 40 to swinging bracket 36 keeps gears 12 and 14 from greater disengagement than may be desirable in terms of tooth wear, shock loads on the teeth, and the like, as will be understood by competent gear designers.

It is noted that motor 16 is equipped with a conventional brake which is operable directly at the will of the operator by means of an elongated lever 46, here shown as a handle. When lever 46 is alined with line of centers E—E, as in the drawings, the brake is in its "off" position. When lever 46 is at right angles to line E—E, the motor brake is applied.

Operator-operable means 48 are provided for ready nonpowered traverse of turret 6. Thus, a crank having a radial element 50 and an actuator 52 are provided on a crankshaft 54 for direct operation (i.e., not powered by motor 16) by the gunner in case motor 16 is disabled. Preferably, means 48 are conventionally so designed that motor 16 will be disengaged from turret drive with actuator 52 in the position shown in FIG. 1, and crankshaft 54 will be disengaged from turret drive when actuator 52 is folded, on hinge 56, through 90° as to lie against radial element 50.

The operator-operable brake controlled by lever 46 will normally be "off" for shipping or for operator operation of turret traverse by means 48. The mechanisms for the brake controlled by lever 46 and turret traverse by means 48 form no part of this invention and thus are not detailed here.

OPERATION

As the vehicle heads into combat, crew members are on the alert for possible targets, such as emplaced artillery, enemy tanks, and the like. When a target is initially sighted, there is a good probability that it will not lie in the field of view of the sighting device, in which case the gunner must as quickly as possible slew the turret around to bring the target within said field of view. Powered maximum traverse, or rapid traverse by the means 48, may put enough pressure on spring 34 to exceed the preset maximum for zero backlash, and if so, the teeth of gears 12 and 14 will separate somewhat. However, total disengagement of the gears will not occur because of the limit imposed by swinging bracket 36 engaging stop 40 on the end of threaded member 32.

During target tracking by the gunner before the missile is fired, precise control of weapon traverse is accomplished by the zero backlash achieved by spring 34 in contact with swinging bracket 36, and the gunner keeps the weapon on target before firing, by accurate control of turret traverse.

It is noted that, in the fire control device actually constructed, after all adjustments were made, spring 34 was compressed approximately ⅜ of an inch. At that setting of the spring, there was no separation of the gear teeth (i.e., backlash) until approximately 20% to 33% of the available torque was reached.

With the invention herein disclosed and claimed, an AGMA (American Gear Manufacturers' Association) Grade 5 pinion-ring gear assembly, costing about $500, can be used to achieve the necessary precision. With conventional gear designs, an AGMA Grade 15 pinion-ring gear assembly costing $40,000 would be required to achieve the needed precision.

I wish it to be understood that I do not desire to be limited to the exact details of construction shown and described, for obvious modifications will occur to a person skilled in the art.

What is claimed is:

1. A precision power gear train assembly for imparting relative rotation between a relatively stationary member of a power user device and a relatively rotatable driven member mounted thereon about a given body axis via enmeshed output and compatible gears thereof, and embodying novel means for minimizing backlash of said enmeshed gears, said precision power gear train assembly comprising:

(a) a power drive gear train and a power train support therefor collectively mounted for oscillation upon the rotatable driven member and oscillatable about a first axis;

(b) the power gear train having an output gear mounted on said support and disposed for rotation about a second axis which is spaced from and substantially parallel to said first axis as well as to said given body axis;

(c) said output gear being adapted to mesh with a relatively stationary compatible gear of said power user device, with the compatible gear axis coinciding with said given body axis;

(d) the line of centers of the output gear and said meshing compatible gear forming a right angle with another line intersecting said first and second axes of rotation; and (e) compression spring means for yieldably biasing the two gears into mesh to eliminate backlash under a load of gear tooth pressure imposed which is no greater than a given maximum and also to permit separation of the two gears when tooth pressure loads exceed said maximum.

2. The assembly as defined in claim 1, further including stop means to limit the amount of gear separation to less than total disengagement of the two gears from each other.

3. The assembly as defined in claim 2, wherein said stop means is adjustable in character to vary the degree of limited separation of the said gears, and said stop means disposed closely adjacent said compression spring means.

4. For use in a vehicle having a basic supporting structure, a turret rotatable on the basic supporting structure about a turret axis, a weapon mounted on and rotatable with the turret, and an improved combined turret drive-fire control means for the weapon, said combined turret drive-fire control means comprising:

(a) a base plate forming an integral part of the turret and rotatable with the turret about a turret axis;

(b) a ring gear on the basic supporting structure, the gear center being coincident with said turret axis;

(c) a power drive gear train assembly comprising
  i. a gear box housing constituting a power train support having a mounting axis or first axis at one end,
  ii. a turret drive motor on the power train support,
  iii. the gear train including an output gear which is in mesh with the ring gear, said output gear being mounted for rotation on its own or second axis and which together with the power train support is oscillatable about said mounting or first axis which is substantially parallel to said second axis and also to said turret axis, and
  iv. means for transmitting torque of said turret drive motor operably connected so as to be driven by the motor and to drive the output gear;

(d) bracket and pivot means for mounting the power train support on the base plate for oscillation about said mounting or first axis as aforesaid substantially parallel to said turret axis and ring gear, and also to said axis of said output gear, whereby the tooth pressure due to the output gear driving the ring gear tends to separate those two gears by oscillation of the power train support about its oscillation axis;

(e) compression spring means interposed between cooperatively opposed brackets mounted respectively on said power train support and said base plate of said turret at an area spaced from the pivot-/oscillation axis of said power train support mounting; said spring means yieldably biasing said output gear into mesh with said ring gear to minimize backlash aided by adjustment means associated therewith so as to assure elimination of gear tooth backlash under an imposed load of tooth pressure which is less than a predetermined maximum value, and which also permits limited separation of said two gears when said tooth pressure loads exceed said predetermined maximum value;

(f) adjustable bolt stop means disposed adjacent said spring means and also cooperative with said opposed brackets to limit the amount of gear separation to a predetermined maximum less than total disengagement of the gears from each other; and (g) wherein the line of centers of the output and ring gear bears is at such an angle to the line of centers of the oscillation axis and the output gear, that is at essentially 90°, that the force resulting from pressure at the point of tooth contact which tends to separate the meshing output and ring gears is unaffected by direction of rotation of the meshing output and ring gears.

5. For use in a vehicle having a basic supporting structure, a turret rotatable on the basic supporting structure about a turret axis, a weapon mounted on and rotatable with the turret, and an improved combined turret drive-fire control means for the weapon, said combined turret drive-fire control means comprising:

(a) a base plate forming an integral part of the turret and rotatable with the turret about a turret axis;

(b) a ring gear on the basic supporting structure, the gear center being coincident with said turret axis;

(c) a power drive gear train assembly comprising
  i. a gear box housing constituting a power train support having a mounting axis or first axis at one end,
  ii. a turret drive motor on the power train support,
  iii. the gear train including an output gear which is in mesh with the ring gear, said output gear being mounted for rotation on its own or second axis and which together with the power train support is oscillatable about said mounting or first axis which is substantially parallel to said second axis and also to said turret axis, and
  iv. means for transmitting torque of said turret drive motor operably connected so as to be driven by the motor and to drive the output gear;

(d) bracket and pivot means for mounting the power train support on the base plate for oscillation about said mounting or first axis as aforesaid substantially parallel to said turret axis and ring gear, and also to said axis of said output gear, whereby the tooth pressure due to the output gear driving the ring gear tends to separate those two gears by oscillation of the power train support about its oscillation axis;

(e) compression spring means interposed between cooperatively opposed brackets mounted respectively on said power train support and said base plate of said turret at an area spaced from the pivot-/oscillation axis of said power train support mounting; said spring means yieldably biasing said output gear into mesh with said ring gear to minimize backlash aided by adjustment means associated therewith so as to assure elimination of gear tooth backlash under an imposed load of tooth pressure which is less than a predetermined maximum value, and which also permits limited separation of said two gears when said tooth pressure loads exceed said predetermined maximum value;
(f) adjustable bolt stop means disposed adjacent said spring means and also cooperative with said opposed brackets to limit the amount of gear separation to a predetermined maximum less than total disengagement of the gears from each other;
(g) wherein said gear box housing constituting the power train support has a pair of generally opposed ends, one end being the end having said mounting axis thereat; and
(h) wherein said cooperatively opposed brackets include first and second brackets;
  i. said first bracket having an arm affixed to and projecting away from and beyond the end of said power train support opposite from that of said mounting axis, said arm being swingable with said power train support thus constituting a swinging arm;
  ii. said swinging arm having a combined biasing-and-stop-engaging surface of generally planar form disposed generally parallel to both a plane passing through the centers of said first and second axes of rotation and to said turret axis;
  iii. said second bracket also having a generally planar portion which upstands from said base plate of said turret, which latter planar portion is disposed to confront the aforesaid swinging arm's planar portion in generally parallel fashion; and
(i) wherein said adjustment means associated with said compression spring means includes a pair of adjustable threaded bolt and lock nut assemblies projectable from one of said brackets planar surfaces in side-by-side relation, one of said bolts having an end forming an adjustable seat for said compression spring, so that as backlash increases between the operatively enmeshed pinion drive gear and ring gear, appropriate pressure is exerted by said adjustable spring means directly on the other bracket to force said swinging arm/first bracket and said second bracket further apart.

6. The improvement as defined in claim 5 wherein the line of centers of the output and ring gears is at such an angle to the line of centers of the oscillation axis and the output gear, that is at essentially 90°, that the force resulting from pressure at the point of tooth contact which tends to separate the meshing output and ring gears is unaffected by direction of rotation of the meshing output and ring gears.

* * * * *